United States Patent
Rodriguez et al.

(10) Patent No.: US 10,199,042 B2
(45) Date of Patent: *Feb. 5, 2019

(54) CONTEXT-BASED SMARTPHONE SENSOR LOGIC

(71) Applicant: Digimarc Corporation, Beaverton, OR (US)

(72) Inventors: Tony F. Rodriguez, Portland, OR (US); Yang Bai, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,357

(22) Filed: Sep. 21, 2017

(65) Prior Publication Data

US 2018/0130472 A1 May 10, 2018

Related U.S. Application Data

(60) Continuation of application No. 15/446,837, filed on Mar. 1, 2017, and a continuation-in-part of
(Continued)

(51) Int. Cl.
*G10L 15/28* (2013.01)
*G06T 7/00* (2017.01)
(Continued)

(52) U.S. Cl.
CPC ........ *G10L 15/285* (2013.01); *G06K 9/00006* (2013.01); *G06K 9/00013* (2013.01);
(Continued)

(58) Field of Classification Search
CPC ....... G10L 15/285; G10L 15/08; G10L 15/20; G10L 15/22; G10L 19/00;
(Continued)

(56) References Cited

U.S. PATENT DOCUMENTS

| 5,799,068 A | 8/1998 | Kikinis et al. |
| 6,722,569 B2 | 4/2004 | Ehrhart et al. |

(Continued)

FOREIGN PATENT DOCUMENTS

| JP | 2000322078 | 11/2000 |
| JP | 2008009120 | 1/2008 |

(Continued)

OTHER PUBLICATIONS

Alin, Object Tracking with Iphone 3G's, dated Feb. 16, 2010.
(Continued)

*Primary Examiner* — Dinh Nguyen
(74) *Attorney, Agent, or Firm* — Digimarc Corporation

(57) ABSTRACT

Methods employ sensors in portable devices (e.g., smartphones) both to sense content information (e.g., audio and imagery) and context information. Device processing is desirably dependent on both. For example, some embodiments activate certain processor intensive operations (e.g., content recognition) based on classification of sensed content and context. The context can control the location where information produced from such operations is stored, or control an alert signal indicating, e.g., that sensed speech is being transcribed. Some arrangements post sensor data collected by one device to a cloud repository, for access and processing by other devices. Multiple devices can collaborate in collecting and processing data, to exploit advantages each may have (e.g., in location, processing ability, social network resources, etc.). A great many other features and arrangements are also detailed.

16 Claims, 6 Drawing Sheets

Related U.S. Application Data application No. 15/139,671, filed on Apr. 27, 2016, now Pat. No. 9,830,950, said application No. 15/446,837 is a continuation of application No. 14/947,008, filed on Nov. 20, 2015, now Pat. No. 9,595,258, said application No. 15/139,671 is a continuation of application No. 14/157,108, filed on Jan. 16, 2014, now Pat. No. 9,330,427, said application No. 14/947,008 is a division of application No. 13/607,095, filed on Sep. 7, 2012, now Pat. No. 9,196,028, said application No. 14/157,108 is a division of application No. 13/299,140, filed on Nov. 17, 2011, now Pat. No. 8,819,172, which is a continuation-in-part of application No. PCT/US2011/059412, filed on Nov. 4, 2011, which is a continuation-in-part of application No. 13/278,949, filed on Oct. 21, 2011, now Pat. No. 9,183,580, and a continuation-in-part of application No. 13/207,841, filed on Aug. 11, 2011, now Pat. No. 9,218,530, and a continuation-in-part of application No. 13/174,258, filed on Jun. 30, 2011, now Pat. No. 8,831,279.

(60) Provisional application No. 61/542,737, filed on Oct. 3, 2011, provisional application No. 61/538,578, filed on Sep. 23, 2011, provisional application No. 61/501,602, filed on Jun. 27, 2011, provisional application No. 61/485,888, filed on May 13, 2011, provisional application No. 61/483,555, filed on May 6, 2011, provisional application No. 61/479,323, filed on Apr. 26, 2011, provisional application No. 61/471,651, filed on Apr. 4, 2011.

(51) Int. Cl.

| | |
|---|---|
| *G10L 15/22* | (2006.01) |
| *G06K 9/00* | (2006.01) |
| *G06K 9/62* | (2006.01) |
| *G10L 15/08* | (2006.01) |
| *G10L 15/20* | (2006.01) |
| *H04M 1/725* | (2006.01) |
| *G10L 19/00* | (2013.01) |

(52) U.S. Cl.
CPC ..... *G06K 9/00228* (2013.01); *G06K 9/00892* (2013.01); *G06K 9/6267* (2013.01); *G06T 7/00* (2013.01); *G10L 15/08* (2013.01); *G10L 15/20* (2013.01); *G10L 15/22* (2013.01); *G10L 19/00* (2013.01); *H04M 1/72569* (2013.01); *G10L 2015/226* (2013.01); *H04M 2250/12* (2013.01)

(58) Field of Classification Search
CPC .......... G10L 2015/226; G06K 9/00006; G06K 9/00013; G06K 9/00228; G06K 9/00892; G06K 9/6267; G06T 7/00; H04M 1/72569; H04M 2250/12
See application file for complete search history.

(56) References Cited

U.S. PATENT DOCUMENTS

| | | | |
|---|---|---|---|
| 7,076,737 | B2 | 7/2006 | Abbott et al. |
| 7,512,889 | B2 | 3/2009 | Newell et al. |
| 7,565,294 | B2 | 7/2009 | Rhoads |
| 7,774,504 | B2 | 8/2010 | Chene et al. |
| 9,196,028 | B2 | 11/2015 | Rodriguez et al. |
| 9,595,258 | B2 | 3/2017 | Rodriguez et al. |
| 2002/0055924 | A1 | 5/2002 | Liming |
| 2002/0065063 | A1 | 5/2002 | Uhlik |
| 2003/0062419 | A1 | 4/2003 | Ehrhart et al. |
| 2004/0138877 | A1 | 7/2004 | Ariu |
| 2005/0198095 | A1 | 9/2005 | Du et al. |
| 2006/0009702 | A1 | 1/2006 | Iwaki et al. |
| 2006/0031684 | A1 | 2/2006 | Sharma et al. |
| 2006/0047704 | A1 | 3/2006 | Gopalakrishnan |
| 2006/0107219 | A1 | 5/2006 | Ahya et al. |
| 2007/0100480 | A1 | 5/2007 | Sinclair et al. |
| 2007/0112567 | A1 | 5/2007 | Lau et al. |
| 2007/0192352 | A1 | 8/2007 | Levy |
| 2007/0286463 | A1 | 12/2007 | Ritzau |
| 2008/0057911 | A1* | 3/2008 | Lauper .............. G06F 17/30743 455/412.1 |
| 2008/0267504 | A1 | 10/2008 | Schloter et al. |
| 2008/0296392 | A1 | 12/2008 | Connell et al. |
| 2009/0002491 | A1 | 1/2009 | Haler |
| 2009/0031814 | A1 | 2/2009 | Takiguchi |
| 2009/0164896 | A1 | 6/2009 | Thorn |
| 2010/0004926 | A1 | 1/2010 | Neoran et al. |
| 2010/0036717 | A1 | 2/2010 | Trest |
| 2010/0046842 | A1* | 2/2010 | Conwell .......... G06F 17/30265 382/218 |
| 2010/0048242 | A1 | 2/2010 | Rhoads et al. |
| 2010/0070272 | A1 | 3/2010 | Lee et al. |
| 2010/0070284 | A1 | 3/2010 | Oh |
| 2010/0158310 | A1 | 6/2010 | McQueen et al. |
| 2010/0162105 | A1 | 6/2010 | Beebe et al. |
| 2010/0211693 | A1* | 8/2010 | Master .............. G06F 17/30743 709/238 |
| 2010/0226526 | A1 | 9/2010 | Modro et al. |
| 2010/0271365 | A1 | 10/2010 | Smith et al. |
| 2010/0277611 | A1 | 11/2010 | Holt et al. |
| 2010/0284617 | A1 | 11/2010 | Ritzau et al. |
| 2010/0318470 | A1 | 12/2010 | Meinel et al. |
| 2011/0043652 | A1 | 2/2011 | King et al. |
| 2011/0098056 | A1 | 4/2011 | Rhoads |
| 2011/0125735 | A1 | 5/2011 | Petrou et al. |
| 2011/0131040 | A1 | 6/2011 | Huang et al. |
| 2011/0137895 | A1 | 6/2011 | Petrou et al. |
| 2011/0150292 | A1 | 6/2011 | Boncyk et al. |
| 2011/0153050 | A1 | 6/2011 | Bauer et al. |
| 2011/0159921 | A1 | 6/2011 | Davis et al. |
| 2011/0161076 | A1 | 6/2011 | Davis et al. |
| 2011/0212717 | A1 | 9/2011 | Rhoads et al. |
| 2011/0233278 | A1 | 9/2011 | Patel et al. |
| 2011/0244919 | A1 | 10/2011 | Aller et al. |
| 2012/0013766 | A1 | 1/2012 | Rothschild |
| 2012/0023060 | A1 | 1/2012 | Rothkopf et al. |
| 2012/0034904 | A1 | 2/2012 | LeBeau et al. |
| 2012/0059780 | A1 | 3/2012 | Kononen et al. |
| 2012/0075168 | A1 | 3/2012 | Osterhout et al. |
| 2012/0078397 | A1 | 3/2012 | Lee et al. |
| 2012/0141660 | A1 | 6/2012 | Fiedler |
| 2012/0143655 | A1 | 6/2012 | Sunaoshi et al. |
| 2012/0224743 | A1 | 9/2012 | Rodriguez et al. |
| 2012/0284012 | A1 | 11/2012 | Rodriguez et al. |
| 2013/0007201 | A1 | 1/2013 | Jeffrey et al. |
| 2013/0044233 | A1 | 2/2013 | Bai et al. |
| 2013/0090926 | A1 | 4/2013 | Grokop et al. |
| 2013/0097630 | A1 | 4/2013 | Rodriguez et al. |
| 2013/0254422 | A2 | 9/2013 | Master et al. |

FOREIGN PATENT DOCUMENTS

| | | |
|---|---|---|
| WO | WO2011116309 | 9/2011 |
| WO | WO2013043393 | 3/2013 |

OTHER PUBLICATIONS

Benbasat, et al, A framework for the automated generation of power-efficient classifiers for embedded sensor nodes, Proc. of the 5th Int'l Conf. on Embedded Networked Sensor Systems. ACM, 2007.

Brunette, et al., Some sensor network elements for ubiquitous computing, 4th Int'l. Symposium on Information Processing in Sensor Networks, pp. 388-392, 2005.

(56) References Cited

OTHER PUBLICATIONS

Chen, et al, "Listen-to-nose: a low-cost system to record nasal symptoms in daily life," 14th International Conference on Ubiquitous Computing, Sep. 5-8, 2012, pp. 590-591.
Csirik, et al Sequential Classifier Combination for Pattern Recognition in Wireless Sensor Networks, 10th Int'l Workshop on Multiple Classifier Systems, Jun. 2011.
Eagle, "Machine Perception and Learning of Complex Social Systems", dated Jun. 27, 2005.
Excerpts from prosecution of corresponding Chinese application 201280054460.1, including amended claims 1-46 on which prosecution is based, translated Text of the First Action dated Mar. 27, 2015, claims submitted in response, translated Text of the Second Action dated Dec. 10, 2015, claims filed in response, and Notice of Allowance dated Apr. 13, 2016.
Excerpts from prosecution of corresponding European application 12833294.7, including amended claims 1-11 on which prosecution is based, Supplemental European Search Report dated Apr. 1, 2015, and Written Opinion dated Apr. 10, 2015,a and claims filed in response in Oct. 2015.
Excerpts from prosecution of U.S. Appl. No. 14/189,236, including original claims, Action dated Aug. 20, 2014, Response dated Nov. 19, 2014, Final Action dated Feb. 5, 2015, Response after Final dated Apr. 6, 2015, Advisory Action dated Apr. 22, 2015, Pre-Brief Conference Request dated May 11, 2015, Pre-Appeal Conference Decision dated May 21, 2015, Applicant responses dated Jun. 2 and 19, 2015, Rejection dated Jun. 19, 2015, Interview summary dated Aug. 13, 2015, Applicant Response dated Aug. 19, 2015, and Notice of Allowance dated Nov. 20, 2015.
Excerpts from prosecution of Japanese patent application P2014-531853, namely originally-presented claims, English translation of Notice of Reasons for Rejection dated Oct. 25, 2016, amended claims of Jan. 2017, and English translation of Final Notice of Rejection dated Jun. 13, 2017.
Kang et al, Orchestrator—An Active Resource Orchestration Framework for Mobile Context Monitoring in Sensor-Rich Mobile Environments, IEEE Conf. on Pervasive Computing and Communications, pp. 135-144, 2010.
Lane, et al., A Survey of Mobile Phone Sensing, IEEE Communications Magazine, 48.9, pp. 140-150, 2010.
Larson, et al., "SpiroSmart: using a microphone to measure lung function on a mobile phone," 14th International Conference on Ubiquitous Computing, Sep. 5-8, 2012, pp. 280-289.
Lu, et al, SpeakerSense: Energy Efficient Unobtrusive Speaker Identification on Mobile Phones, Pervasive Computing Conference, Jun. 2011, pp. 188-205.
Lu, et al., "StressSense: Detecting stress in unconstrained acoustic environments using smartphones," 14th International Conference on Ubiquitous Computing, Sep. 5-8, 2012, pp. 351-360.
Miluzzo, "Sensing Meets Mobile Social Network: The Design, Implementation and Evaluation of the CenceMe Application", dated Nov. 5, 2008.
Miluzzo, "Smartphone Sensing", Dated Jun. 2011.
Misra, et al, Optimizing Sensor Data Acquisition for Energy-Efficient Smartphone-based Continuous Event Processing, 12th IEEE International Conf. on Mobile Data Management, Jun. 2011.
Modro, et al, Digital Watermarking Opportunities Enabled by Mobile Media Proliferation, Proc. SPIE, vol. 7254, Jan. 2009.
Nishihara et al, Power Savings in Mobile Devices Using Context-Aware Resource Control, IEEE Conf. on Networking and Computing, 2010, pp. 220-226.
PCT International Search Report and PCT Written Opinion of the International Searching Authority, PCT/US12/54232, dated Nov. 14, 2012.
Priyantha, et al, Eers—Energy Efficient Responsive Sleeping on Mobile Phones, Workshop on Sensing for App Phones, 2010.
Rodriguez, et al, Evolution of Middleware to Support Mobile Discovery, presented at MobiSense, Jun. 2011.
Soria-Morillo et al, Mobile Architecture for Communication and Development of Applications Based on Context, 12th IEEE Int'l Conf. on Mobile Data Management, Jun. 2011.
Tulusan, et al., "Lullaby: a capture & access systems for understanding the sleep environment," 14th International Conference on Ubiquitous Computing, Sep. 5-8, 2012, pp. 226-234.
Wallach, "Smartphone Security: Trends and Predictions", dated Feb. 17, 2011.
Wang, et al, A Framework of Energy Efficient Mobile Sensing for Automatic User State Recognition, MOBISYS 2009, Jun. 2009, 14 pp.
Yatani et al, "BodyScope: a wearable acoustic sensor for activity recognition," 14th International Conference on Ubiquitous Computing, Sep. 5-8, 2012, pp. 341-350.

\* cited by examiner

| Light | Motion | Image Classification | | | Image Recognition Agent | | | | |
|---|---|---|---|---|---|---|---|---|---|
| | | | 1D | 2D | 1D | 2D | | | |
| Dark=1 | Jerk=1 | Text | barcode | barcode | barcode | barcode | Watermark | Fingerprint | OCR |
| 0 | 0 | 0 | 0 | 0 | 0 | 0 | 1 | 1 | 0 |
| 0 | 0 | 0 | 0 | 1 | 0 | 1 | 0 | 0 | 0 |
| 0 | 0 | 0 | 1 | 0 | 1 | 0 | 0 | 0 | 0 |
| 0 | 0 | 0 | 1 | 1 | 1 | 1 | 0 | 0 | 0 |
| 0 | 0 | 1 | 0 | 0 | 0 | 0 | 0 | 0 | 1 |
| 0 | 0 | 1 | 0 | 1 | 0 | 1 | 0 | 0 | 1 |
| 0 | 0 | 1 | 1 | 0 | 1 | 0 | 0 | 0 | 1 |
| 0 | 0 | 1 | 1 | 1 | 1 | 1 | 1 | 1 | 1 |
| 0 | 1 | 0 | 0 | 0 | 0 | 0 | 0 | 0 | 0 |
| 0 | 1 | 0 | 0 | 1 | 0 | 0 | 0 | 0 | 0 |
| 0 | 1 | 0 | 1 | 0 | 0 | 0 | 0 | 0 | 0 |
| 0 | 1 | 0 | 1 | 1 | 0 | 0 | 0 | 0 | 0 |
| 0 | 1 | 1 | 0 | 0 | 0 | 0 | 0 | 0 | 0 |
| 0 | 1 | 1 | 0 | 1 | 0 | 0 | 0 | 0 | 0 |
| 0 | 1 | 1 | 1 | 0 | 0 | 0 | 0 | 0 | 0 |
| 0 | 1 | 1 | 1 | 1 | 0 | 0 | 0 | 0 | 0 |
| 1 | 0 | 0 | 0 | 0 | 0 | 0 | 0 | 0 | 0 |
| 1 | 0 | 0 | 0 | 1 | 0 | 0 | 0 | 0 | 0 |
| 1 | 0 | 0 | 1 | 0 | 0 | 0 | 0 | 0 | 0 |
| 1 | 0 | 0 | 1 | 1 | 0 | 0 | 0 | 0 | 0 |
| 1 | 0 | 1 | 0 | 0 | 0 | 0 | 0 | 0 | 0 |
| 1 | 0 | 1 | 0 | 1 | 0 | 0 | 0 | 0 | 0 |
| 1 | 0 | 1 | 1 | 0 | 0 | 0 | 0 | 0 | 0 |
| 1 | 0 | 1 | 1 | 1 | 0 | 0 | 0 | 0 | 0 |
| 1 | 1 | 0 | 0 | 0 | 0 | 0 | 0 | 0 | 0 |
| 1 | 1 | 0 | 0 | 1 | 0 | 0 | 0 | 0 | 0 |
| 1 | 1 | 0 | 1 | 0 | 0 | 0 | 0 | 0 | 0 |
| 1 | 1 | 0 | 1 | 1 | 0 | 0 | 0 | 0 | 0 |
| 1 | 1 | 1 | 0 | 0 | 0 | 0 | 0 | 0 | 0 |
| 1 | 1 | 1 | 0 | 1 | 0 | 0 | 0 | 0 | 0 |
| 1 | 1 | 1 | 1 | 0 | 0 | 0 | 0 | 0 | 0 |
| 1 | 1 | 1 | 1 | 1 | 0 | 0 | 0 | 0 | 0 |

FIG. 7

CONTEXT-BASED SMARTPHONE SENSOR LOGIC

RELATED APPLICATION DATA

This application is a continuation of allowed application Ser. No. 15/446,837, filed Mar. 1, 2017, which is a continuation of application Ser. No. 14/947,008, filed Nov. 20, 2015 (now U.S. Pat. No. 9,595,258), which is a divisional of application Ser. No. 13/607,095, filed Sep. 7, 2012 (now U.S. Pat. No. 9,196,028), which is a nonprovisional of applications 61/542,737, filed Oct. 3, 2011, and 61/538,578, filed Sep. 23, 2011. This application is also a continuation in part of pending application Ser. No. 15/139,671, filed Apr. 26, 2016, which is a continuation of application Ser. No. 14/157,108, filed Jan. 16, 2014 (now U.S. Pat. No. 9,330,427), which is a divisional of application Ser. No. 13/299,140, filed Nov. 17, 2011 (now U.S. Pat. No. 8,819,172), which is a continuation in part of application PCT/US11/59412, filed Nov. 4, 2011 (now published as WO2012061760). Application PCT/US11/59412 is a continuation of each of application Ser. No. 13/278,949, filed Oct. 21, 2011 (now U.S. Pat. No. 9,183,580); Ser. No. 13/207,841, filed Aug. 11, 2011 (now U.S. Pat. No. 9,218,530); and Ser. No. 13/174,258, filed Jun. 30, 2011 (now U.S. Pat. No. 8,831,279). Application PCT/US11/59412 is also a nonprovisional of applications 61/501,602, filed Jun. 27, 2011; 61/485,888, filed May 13, 2011; 61/483,555, filed May 6, 2011; 61/479,323, filed Apr. 26, 2011; and 61/471,651, filed Apr. 4, 2011.

BACKGROUND AND SUMMARY

In published applications 20110212717, 20110161076 and 20120208592, the present assignee detailed a variety of smartphone arrangements that respond in accordance with context. The present specification expands these teachings in certain respects.

In accordance with one aspect, systems and methods according to the present technology use a smartphone to sense audio and/or visual information, and provide same to a first classifier module. The first classifier module characterizes the input audio-visual stimuli by type (e.g., music, speech, silence, video imagery, natural scene, face, etc.). A second classifier module processes other context information (which may include the output from the first classifier module), such as of day, day of week, location, calendar data, clock alarm status, motion sensors, Facebook status, etc., and outputs data characterizing a device state type, or scenario. A control rule module then issues control signals to one or more content recognition modules in accordance with the outputs from the two classifier modules.

The control signals can simply enable or disable the different recognition modules. Additionally, if a recognition module is enabled, the control signals can establish the frequency, or schedule, or other parameter(s), by which the module performs its recognition functions.

Such arrangements conserve battery power, by not attempting operations that are unneeded or inappropriate to the context. Moreover, they aid other smartphone operations, since processing resources are not diverted to the idle recognition operations.

The foregoing and other features and advantages of the present technology will be more readily apparent from the following detailed description, which proceeds with reference to the accompanying drawings.

BRIEF DESCRIPTION OF THE DRAWINGS

FIG. 7 is an event controller table illustrating, for one embodiment, how different image recognition agents are activated based on outputs from light and motion sensors, and image classification data.

DETAILED DESCRIPTION

Figure 1:
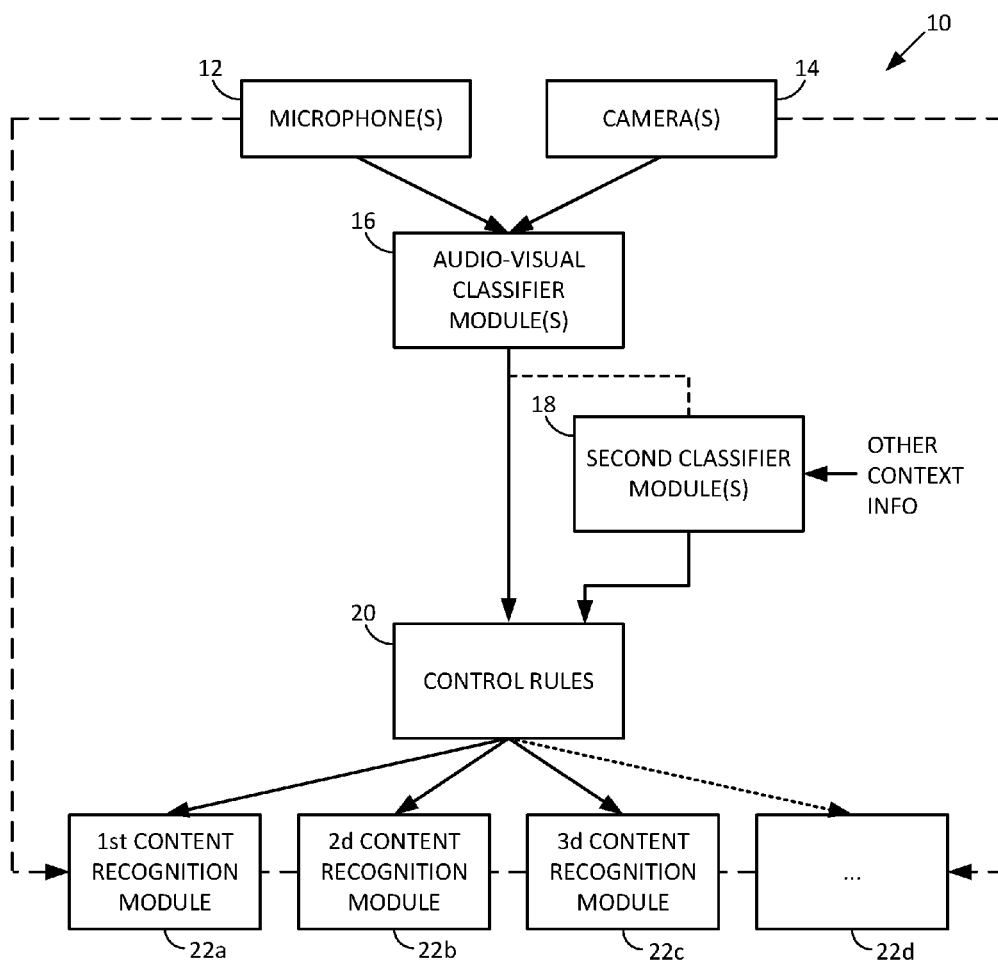
FIG. 1 shows an illustrative embodiment that incorporates certain aspects of the present technology.
Figure 2:
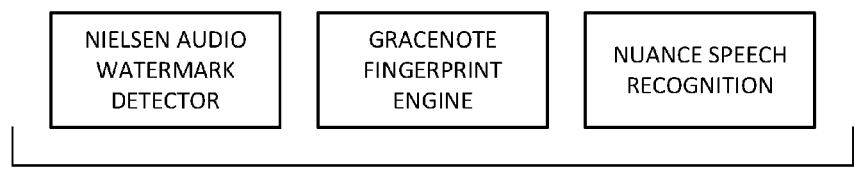
FIG. 2 shows a few of the content recognition modules that may be used in the FIG. 1 embodiment.

Referring to FIG. 1, an illustrative embodiment 10 that incorporates certain aspects of the present technology includes one or more microphones 12, cameras 14, audio-visual classifier modules 16, second classifier modules 18, control rule modules 20, and content recognition modules 22. These components may all be included in a smartphone. Alternatively, they may be distributed between different locations and/or different devices (including the cloud).

One suitable smartphone is the Apple iPhone 4 device, which includes two cameras (one front-facing and one rear-facing), and two microphones. Another is the HTC EVO 3D, which includes stereo cameras (both rear-facing).

The audio-visual classifier module(s) 16 processes the data captured by the microphone(s) and/or camera(s), and classifies such audio-visual content by type.

As is familiar to artisans (and as explained in the Wikipedia article "Statistical classification"), classification is the problem of identifying to which of a set of categories (sub-populations) a new observation belongs. The individual observations may be analyzed into a set of quantifiable properties, known variously as variables, features, etc. These properties may be categorical (e.g. "A", "B", "AB" or "O", for blood type), ordinal (e.g. "large", "medium" or "small"), etc. A familiar (although sometimes difficult) classification problem is identifying email as spam or not-spam. An algorithm or procedure that implements classification is known as a classifier.

Classically, classification is performed based on a training set of data comprising observations (or instances) whose category membership is known. Classification, in this sense, is regarded as an instance of supervised machine learning, i.e., learning where a training set of correctly-identified observations is available. The corresponding unsupervised procedure is known as clustering (or cluster analysis), and involves grouping data into categories based on some measure of inherent similarity (e.g. the distance between instances, considered as vectors in a multi-dimensional vector space). For purposes of the present application, classification is regarded as including clustering.

One illustrative classifier module 16 is an audio classifier, which categorizes input stimulus as speech, music, background/indeterminate, or silence. For the first three, the module also classifies the volume of the audio, as loud, mid-level, or quiet.

Illustrative audio classification technologies are detailed in a later section.

A simple embodiment activates different content recognition modules, in accordance with the output of the audio classifier, as follows:

TABLE I

| Audio Classification | Nielsen Audio Watermark Detector | Gracenote Fingerprint Engine | Nuance Speech Recognition Engine |
|---|---|---|---|
| Silent | | | |
| Quiet background | | | |
| Mid-level background | X | X | X |
| Loud background | X | X | X |
| Music | X | X | |
| Speech | X | | X |

That is, if the audio classifier module classifies the sensed audio as "silent" or "quiet background," all three of the detailed content recognition modules are controlled to "off." If the sensed audio is classified as music, the system activates the Nielsen audio watermark detector, and the Gracenote fingerprint engine, but leaves the Nuance speech recognition engine off.

If the sensed audio is classified as speech, the audio watermark detector is activated, as is the speech recognition engine, but no fingerprint calculations are performed.

If the audio classifier identifies a loud or mid-level acoustic background, but is unable to further classify its type, the audio watermark detector, the fingerprint engine, and the speech recognition engine are all activated.

It will thus be recognized that different combinations of recognition technologies are applied to the input content, based on the type of content indicated by the content classifier.

(The detailed recognition modules are all familiar to artisans. A brief review follows: Nielsen encodes nearly all of the television broadcasts in the United States with an audio watermark that encodes broadcast source and time data, to assist Nielsen in identifying programs for rating surveys, etc. Nielsen maintains a database that correlates source/time data decoded from broadcasts, with program names and other identifiers. Such watermark technology is detailed, e.g., in U.S. Pat. Nos. 6,968,564 and 7,006,555. Gracenote uses audio fingerprinting technology to enable music recognition. Characteristic feature data is derived from audio by a fingerprint engine, and used to query a database containing reference fingerprint data. If a match is found, associated song identification data is returned from the database. Gracenote uses fingerprint technology originally developed by Philips, detailed, e.g., in patent documents 20060075237 and 20060041753. Nuance offers popular speech recognition technology. Its SpeechMagic SDK and/or NaturallySpeaking SDK can be incorporated into embodiments of the present technology to provide speech recognition capability.)

Second classifier module 18 outputs device state type data, or scenario identification data, in accordance with context information. This context information may include the classification of the audio and/or visual environment (i.e., by the audio-visual classifier module(s) 16, as shown by the dashed line in FIG. 1), and typically includes other information.

This other context information can include, but is not limited to, time of day, day of week, location, calendar data, clock alarm status, motion and orientation sensor data, social network information (e.g., from Facebook), etc.

Consider Table II, which expands the Table I information to include certain device state types as determined by the second classifier module (i.e., "away from office after work hours" and "at office during work hours"):

TABLE II

| Device State Type | Nielsen Audio Watermark Detector | Gracenote Fingerprint Engine | Nuance Speech Recognition Engine |
|---|---|---|---|
| Silent, away from office after work hours | | | |
| Quiet background, away from office after work hours | | | |
| Mid-level background, away from office after work hours | X | X | X |
| Loud background, away from office after work hours | X | X | X |
| Loud or quiet music, away from office after work hours | X | X | |
| Loud or quiet speech, away from office after work hours | X | | X |
| Silent, at office during work hours | | | |
| Quiet background, at office during work hours | | | |
| Mid-level background, at office during work hours | | | |
| Loud background, at office during work hours | | | X |
| Loud or quiet music, at office during work hours | | | |
| Loud or quiet speech, at office during work hours | | | X |

It will be recognized that the first five rows of Table II are identical to Table I. They detail how the different modules are controlled when the user is away from the office, after work hours, given the noted audio environments.

The final set of rows is different. These correspond to the device state type of being at the user's office, during work hours. As can be seen, only the speech recognition engine is ever activated in this context (i.e., when speech or loud background audio is sensed); the other modules are left idle regardless of the audio environment.

To determine whether the user is "at office during work hours," or "away from office after work hours," the second classifier module 18 uses inputs such as time of day data and GPS data, in connection with reference data. This reference data establishes—for the particular smartphone user—the times of day that should be classified as work hours (e.g., 8 am-5 pm, Monday-Friday), and the location that should be classified as the office location (e.g., 45.4518° lat, −122.7932° long, +/−0.0012 degrees).

It will be recognized that this arrangement conserves battery power, by not attempting to recognize songs or television programs while the user is at work. It also aids other tasks the smartphone may be instructed to perform at work, since processing resources are not diverted to the idle recognition operations.

More typically, the smartphone considers other factors beyond those of this simple example. Table IIIA shows a more detailed scenario, as classified by the second classifier module 18:

TABLE IIIA

| SENSOR | SCENARIO 1 |
| --- | --- |
| Clock | before 6:30am (M-F) |
| GPS | home |
| Microphone | quiet background |
| Ambient light sensor | dark |
| Camera (front) | dark |
| Camera (back) | dark |
| Accelerometer | zero movement |
| Alarm | set at 6:30am |
| Calendar | earliest meeting is at 10:00am |
| Facebook | nothing special |
| Close (proximity) | spouse |

This confluence of circumstances is classed by the second classifier module as "Scenario 1." It corresponds to the scenario in which the user is probably asleep (it is before 6:30 am on a weekday, and the alarm is set for 6:30; the smartphone is stationary in a quiet, dark environment). The control rules 20 associated with Scenario 1 cause all of the content recognition modules to be inactive.

The following tables show other scenarios, as classified by the second classifier module:

TABLE IIIB

| SENSOR | SCENARIO 2 |
| --- | --- |
| Clock | 6:30am-7:30am (M-F) |
| GPS | home |
| Microphone | mid-level background |
| Ambient light sensor | bright |
| Camera (front) | dark/bright |
| Camera (back) | bright/dark |
| Accelerometer | some movement |
| Alarm | dismissed |
| Calendar | earliest meeting is at 10:00am |
| Facebook | nothing special |
| Close | spouse |

TABLE IIIC

| SENSOR | SCENARIO 3 |
| --- | --- |
| Clock | 7:30am-8:00am (M-F) |
| GPS | commute |
| Microphone | loud background |
| Ambient light sensor | dark/bright |
| Camera (front) | dark/bright |
| Camera (back) | dark/bright |
| Accelerometer | some movement |
| Alarm | dismissed |
| Calendar | earliest meeting is at 10:00am |
| Facebook | nothing special |
| Close | none |

TABLE IIID

| SENSOR | SCENARIO 4 |
| --- | --- |
| Clock | 8:00am-10:00am(M-F) |
| GPS | office |
| Microphone | quiet background |
| Ambient light sensor | bright |
| Camera (front) | bright |
| Camera (back) | dark |
| Accelerometer | zero movement |
| Alarm | dismissed |
| Calendar | earliest meeting is at 10:00am |

TABLE IIID-continued

| SENSOR | SCENARIO 4 |
| --- | --- |
| Facebook | nothing special |
| Close | TomS (workmate); SteveH (workmate); Unknown1; Unknown2 |

TABLE IIIE

| SENSOR | SCENARIO 5 |
| --- | --- |
| Clock | 10:00am-10:30am (M-F) |
| GPS | meeting room 1 |
| Microphone | mid-level background |
| Ambient light sensor | bright |
| Camera (front) | bright |
| Camera (back) | dark |
| Accelerometer | zero movement |
| Alarm | dismissed |
| Calendar | meeting during 10:00am-10:30am |
| Facebook | nothing special |
| Close | RyanC (workmate); LisaM (workmate); MeganP (workmate) |

TABLE IIIF

| SENSOR | SCENARIO 6 |
| --- | --- |
| Clock | 12:00 noon-1:00pm (M-F) |
| GPS | Subway |
| Microphone | loud background |
| Ambient light sensor | dark |
| Camera (front) | dark |
| Camera (back) | dark |
| Accelerometer | some movement |
| Alarm | dismissed |
| Calendar | nothing special |
| Facebook | nothing special |
| Close | Unknown1; Unknown2; Unknown3; Unknown4 |

TABLE IIIG

| SENSOR | SCENARIO 7 |
| --- | --- |
| Clock | 8:00pm-11:00pm (F) |
| GPS | 22323 Colchester Rd, Beaverton |
| Microphone | loud background |
| Ambient light sensor | bright |
| Camera (front) | bright |
| Camera (back) | dark |
| Accelerometer | zero movement |
| Alarm | nothing special |
| Calendar | friend's B-day party 8:00pm |
| Facebook | friend's B-day today |
| Close | PeterM (buddy); CarrieB (buddy); SheriS (buddy); Unknown1 . . . Unknown 7 |

TABLE IIIH

| SENSOR | SCENARIO 8 |
| --- | --- |
| Clock | 10:00pm-4:00am |
| GPS | road |
| Microphone | any |
| Ambient light sensor | dark |
| Camera (front) | dark |
| Camera (back) | dark |
| Accelerometer/motion | >30 miles per hour |
| Alarm | nothing special |

TABLE IIIH-continued

| SENSOR | SCENARIO 8 |
|---|---|
| Calendar | nothing special |
| Facebook | nothing special |
| Close | — |

Scenario 2 (Table IIIB) corresponds to the user after waking up and before leaving home. The rules include instructions appropriate to this interval—while the user may be watching a morning news program on television, listening to the radio, or talking with a spouse. In particular, the Nielsen watermark detector is active, to allow the user to link to additional web content about something discussed on the television. The fingerprint engine is also active, so that the user might identify an appealing song that airs on the radio. Speech recognition may also be enabled, so that the spouse's verbal instructions to pick up ketchup, grapes, tin foil and postage stamps on the way home are transcribed for later reference.

The user's smartphone also includes various visual content recognition capabilities, including facial recognition. The control rules specify that, in Scenario 2, facial recognition is disabled—as the user isn't expected to need prompting to recall faces of anyone encountered at home this early.

Scenario 3 (Table IIIC) corresponds to the user's drive to work. No television audio is expected in this environment, so the Nielsen watermark detector is disabled. Song recognition and transcription of news from talk radio, however, may be helpful, so the fingerprint and speech recognition engines are enabled. Again, facial recognition is disabled.

A different user may take the bus to work, instead of drive a car. Second scenario control rules for this user may be different. Without a car radio, song recognition is unneeded, so the fingerprint engine is disabled. However, the user sometimes overhears amusing conversations on the bus, so speech recognition is enabled so that any humorous dialog may be shared with work-mates. Occasionally, the user sees someone she should recognize on the bus—a parent of a child's soccer teammate, for example—but be unable to recall the name in this different environment. To prepare for this eventuality, the smartphone's facial recognition capability is loaded into memory and ready for operation, but does not process a frame of camera imagery until signaled by the user. (The signal may comprise the user holding the phone in a predetermined pose and saying the word "who.")

The confluence of sensor information detailed in Table IIID—which the second classifier module identifies as Scenario 4—corresponds to the circumstance of the user's morning work at her desk. The smartphone is apparently lying face-up on a surface in the quiet work environment. The corresponding control rules specify that all recognition modules are disabled. However, if the audio classifier indicates a change in audio environment—to mid-level or loud background sound, or speech, the rules cause the phone to enable the speech recognition module. This provides the user with a transcribed record of any request or information she is given, or any instruction she issues, so that it may be referred-to later.

Speech recognition can raise privacy concerns in some situations, including a work setting. Accordingly, the control rules cause the speech recognition module to issue an audible "beep" every thirty seconds when activated at work, to alert others that a recording is being made. In contrast, no "beep" alert is issued in the previously-discussed scenarios, because no recording of private third party speech is normally expected at home or in the car, and there is likely no expectation of privacy for speech overheard in a bus.

Another datum of context that is processed by the illustrated second classifier module 18 is the number and identity of people nearby. "Nearby" may be within the range of a Bluetooth signal issued by a person's cell phone—typically 30 feet or less. Relative distance within this range can be assessed by strength of the Bluetooth signal, with a strong signal indicating, e.g., location within ten feet or less (i.e., "close"). Identity can be discerned—at least for familiar people—by reference to Bluetooth IDs for their known devices. Bluetooth IDs for devices owned by the user, family members, workmates, and other acquaintances, may be stored with the control rules to help discriminate well known persons from others.

Returning briefly to the previous scenarios, the rules can provide that speech recognition—if enabled—is performed without alert beeps, if the user is apparently solitary (i.e., no strong Bluetooth signals sensed, or only transitory signals—such as from strangers in nearby vehicles), or if the user is in the presence only of family members. However, if an unfamiliar strong Bluetooth signal is sensed when speech recognition is enabled, the system can instruct issuance of periodic alert beeps.

(If the user's phone issues speech recognition alert beeps at home, because the user's child has a new device with an unrecognized Bluetooth identifier, the user's phone can present a user interface screen allowing the user to store this previously-unrecognized Bluetooth identifier. This UI allows the user to specify the identifier as corresponding to a family member, or to associate more particular identification information with the identifier (e.g., name and/or relationship). By such arrangement, beeping when not warranted is readily curtailed, and avoided when such circumstance recurs in the future.)

Scenario 5—a work meeting—is contextually similar to Scenario 4, except the audio classifier reports mid-level background audio, and the phone's location is in a meeting room. The speech recognition module is enabled, but corporate data retention policies require that transcripts of meetings be maintained only on corporate servers, so that they can be deleted after a retention period (e.g., 12 months) has elapsed. The control rules module 20 complies with this corporate policy, and immediately transmits the transcribed speech data to a corporate transcriptions database for storage—keeping no copy. Alert beeps are issued as a courtesy reminder of the recording. However, since all the close-by persons are recognized to be "friends" (i.e., their Bluetooth identifiers correspond to known workmates), the rules cause the phone to beep only once every five minutes, instead of once every 30 seconds, to reduce the beeps' intrusiveness. (Additionally or alternatively, the volume of the beeps can be reduced, based on a degree of social relationship between the user and the other sensed individual(s)—so that the beeps are louder when recording someone who is only distantly or not at all socially related to the user.)

Rules for face recognition in scenario 5 can vary depending on whether people sensed to be close-by are recognized by the user's phone. If all are recognized, the facial recognition module is not activated. However, if one or more close-by persons are not in the user's just-noted "friends" list (or within some more distant degree of relationship in a social network), then facial recognition is enabled as before—in an on-demand (rather than free-running) mode. (Alternatively, a different arrangement can be employed, e.g., with facial recognition activated if one or persons who have a certain type of social network linkage to the user, or absence thereof, are sensed to be present.)

Scenario 6 finds the user in a subway, during the noon hour. The rules may be like those noted above for the bus commute. However, radio reception underground is poor. Accordingly, any facial recognition operation consults only facial eigenface reference data stored on the phone—rather than consulting the user's larger collection of Facebook or Picasa facial data, which are stored on cloud servers.

Scenario 7 corresponds to a Friday evening birthday party. Lots of unfamiliar people are present, so the rules launch the facial recognition module in free-running mode—providing the user with the names of every recognized face within the field-of-view of any non-dark camera. This module relies on the user's Facebook and Picasa facial reference data stored in the cloud, as well as such data maintained in Facebook accounts of the user's Facebook friends. Speech recognition is disabled. Audio fingerprinting is enabled and—due to the party context—the phone has downloaded reference fingerprints for all the songs on Billboard's primary song lists (Hot 100, Billboard 200, and Hot 100 Airplay). Having this reference data cached on the phone allows much quicker operation of the song recognition application—at least for these 200+ songs.

Additional Information

Fingerprint computation, watermark detection, and speech/facial recognition are computationally relatively expensive ("computationally heavy"). So are many classification tasks (e.g., speech/music classification). It is desirable to prevent such processes from running at a 100% duty cycle.

One approach is to let the user decide when to run one or more heavy modules—with help from the output of one or more computationally light detectors. Adding additional steps to assess the signal quality prior to running one or more heavy detectors is another approach.

Reducing the duty cycle of a heavy module implies the possibility of missed detection, so the user should have some control over how much compromise she/he wants.

Consider a simple classifier (e.g., a quietness classifier), which simply checks the ambient audio energy within a one-second long audio frame, and compares this value to a pre-defined threshold. Such module may indicate that there is a sudden change in the environment from a quiet state. Rules may call for activation of one or more heavy classifiers to determine whether the new audio environment is music or speech. In this case, the system may present a display screen with a "Confirm to Proceed" button that the user taps to undertake the classification. (There can also be an "Ignore" button. The system can have a default behavior, e.g., "Ignore," if the user makes no selection within a pre-defined interval, such as ten seconds.)

The user response to such prompts can be logged, and associated with different context information (including the sensitivity of the quietness classifier). Over time, this stored history data can be used to predict the circumstances in which the user instructs the heavy classifier to proceed. Action can then be taken based on such historical precedent, rather than always resorting to a user tap.

That is, the system can be self-learning, based on user interaction. For example, when a quietness classifier detects a change in loudness of amount "A," it asks for the user's permission to enable a heavier classifier (for example, music versus speech classifier) or detector (e.g., watermark detector). If the user agrees, then this "A" level of loudness change is evidently at least sometimes of interest to the user. However, if over time, it becomes evident that the user uniformly refuses to activate the heavy classifier when the loudness changes by amount "A," then the classifier can reset its threshold accordingly, and not ask the user for permission to activate the heavy module unless the loudness increases by "B" (where B>A). The quietness classifier thus learns to be less sensitive.

Conversely, if the user manually launches the heavy module when the quietness classifier has sensed a change in loudness too small to trigger a UI prompt to the user, this indicates that the threshold used by the quietness classifier is too high, and should be changed to a lower level. The quietness classifier thus learns to be more sensitive.

Figure 3:
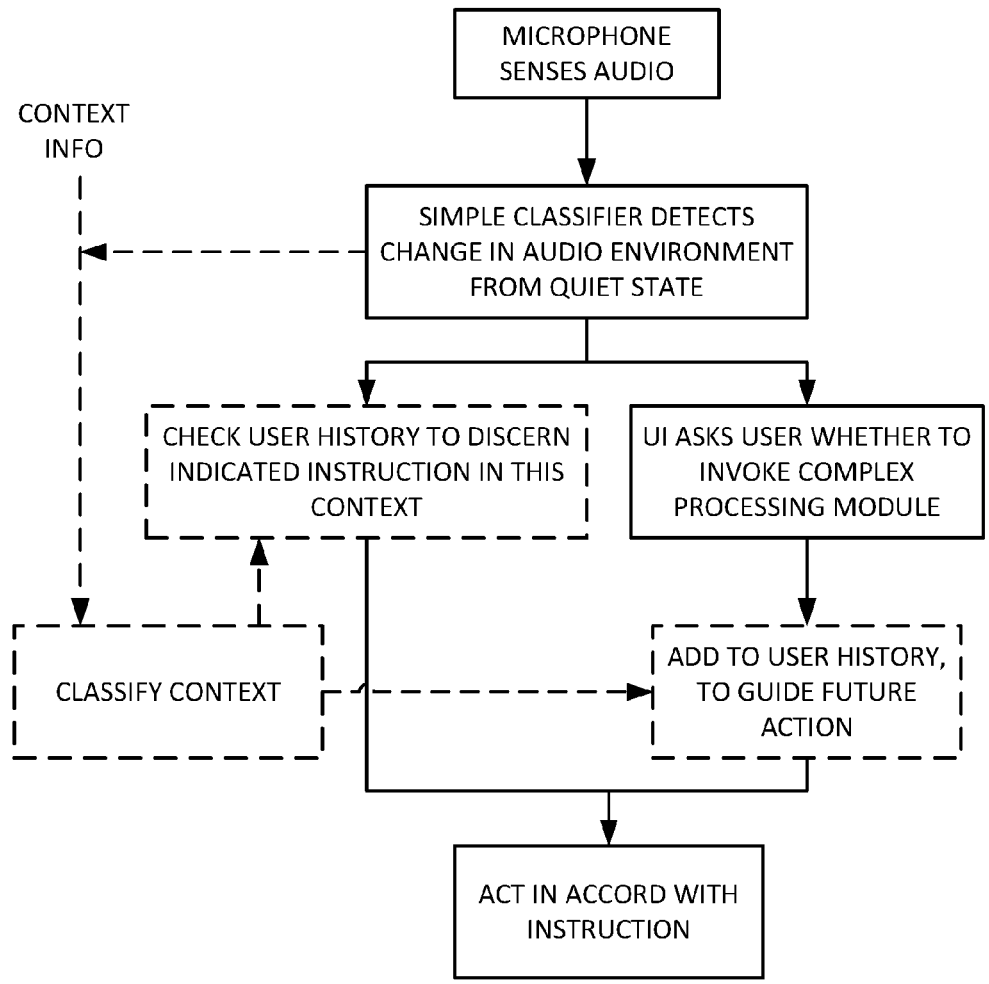
FIG. 3 is a block diagram of a process employing aspects of the present technology.

FIG. 3 shows an arrangement using the foregoing principles. A microphone provides an ambient audio signal to a simple classifier, which produces an output based on a gross classification (e.g., silence or sound), based on a threshold audio level. If the classifier module switches from "silence" to "sound," it causes the smartphone to present a user interface (UI) asking the user whether the system should invoke complex processing (e.g., speech recognition, speech/music classification, or other operation indicated by applicable rules). The system then acts in accordance with the user's instruction.

Shown in dashed lines are additional aspects of the method that may be included. For example, the user's response—entered through the UI—is logged and added to a user history, to guide future automated responses by the system. The current context is also stored in such history, as provided by a context classifier. In some cases, the user history, alone, may provide instructions as to how to respond in a given situation—without the need to ask the user.

(It will be recognized that instead of asking the user whether to invoke the complex processing module when the context changes, the system can instead ask whether the complex processing module should not be invoked. In this case the user's inaction results in the processing module being invoked.)

Another approach is to employ an additional classifier, to decide whether the current audio samples have a quality that merits further classification (i.e., with a heavy classifier). If the quality is judged to be insufficient, the heavy classifier is not activated (or is de-activated).

Information-bearing signals—such as speech and music—are commonly characterized by temporal variation, at least in spectral frequency content, and also generally in amplitude, when analyzed over brief time windows (e.g., 0.5 to 3 seconds). An additional classifier can listen for audio signals that are relatively uniform in spectral frequency content, and/or that are relatively uniform in average amplitude, over such a window interval. If such a classifier detects such a signal, and the amplitude of such signal is stronger by a threshold amount (e.g., 3 dB) than a long-term average amplitude of the sensed audio environment (e.g., over a previous interval of 3-30 seconds), the signal may be regarded as interfering noise that unacceptably impairs the signal-to-noise ratio of the desired audio. In response to such a determination, the system discontinues heavy module processing until the interfering signal ceases.

To cite an extreme case, consider a user riding a bus that passes a construction site where a loud jack-hammer is being used. The just-discussed classifier detects the interval during which the jack-hammer is operated, and interrupts heavy audio processing during such period.

Such classifier may similarly trigger when a loud train passes, or an air compressor operates, or even when a telephone rings—causing the system to change from its normal operation in these circumstances.

Another simple classifier relies on principles noted in Lu et al, SpeakerSense: Energy Efficient Unobtrusive Speaker Identification on Mobile Phones, Pervasive Computing Conf., 2011. Lu et al use a combination of signal energy (RMS) and zero crossing rate (ZCR) to distinguish human speech from other audio. While Lu et al use these parameters to identify speech, they can also be used to identify information-bearing signals more generally. (Or, stated otherwise, to flag audio passages that are likely lacking information, so that heavy processing modules can be disabled.)

As a further alternative, since the additional classifier works after the detection of "sound change," audio samples prior to the "sound change" can be used as an approximation of the background noise, and the audio sample after the "sound change" can be used as the background noise plus the useful signal. This gives a crude signal-to-noise ratio. The additional classifier can keep heavy modules in an idle state until this ratio exceeds a threshold value (e.g., 10 dB).

Still another additional classifier—to indicate the likely absence of an information-bearing signal—simply looks at a ratio of frequency components. Generally, the presence of high frequency signal components above a threshold amplitude is an indication of audio information. A ratio of energy in high frequency components (e.g., above 2 KHz) compared to energy in low frequency components (e.g., below 500 Hz) can serve as another simple signal-to-noise ratio. If the classifier finds that such ratio is below 3 or 10 dB, it can suspend operation of heavy modules.

Figure 4:
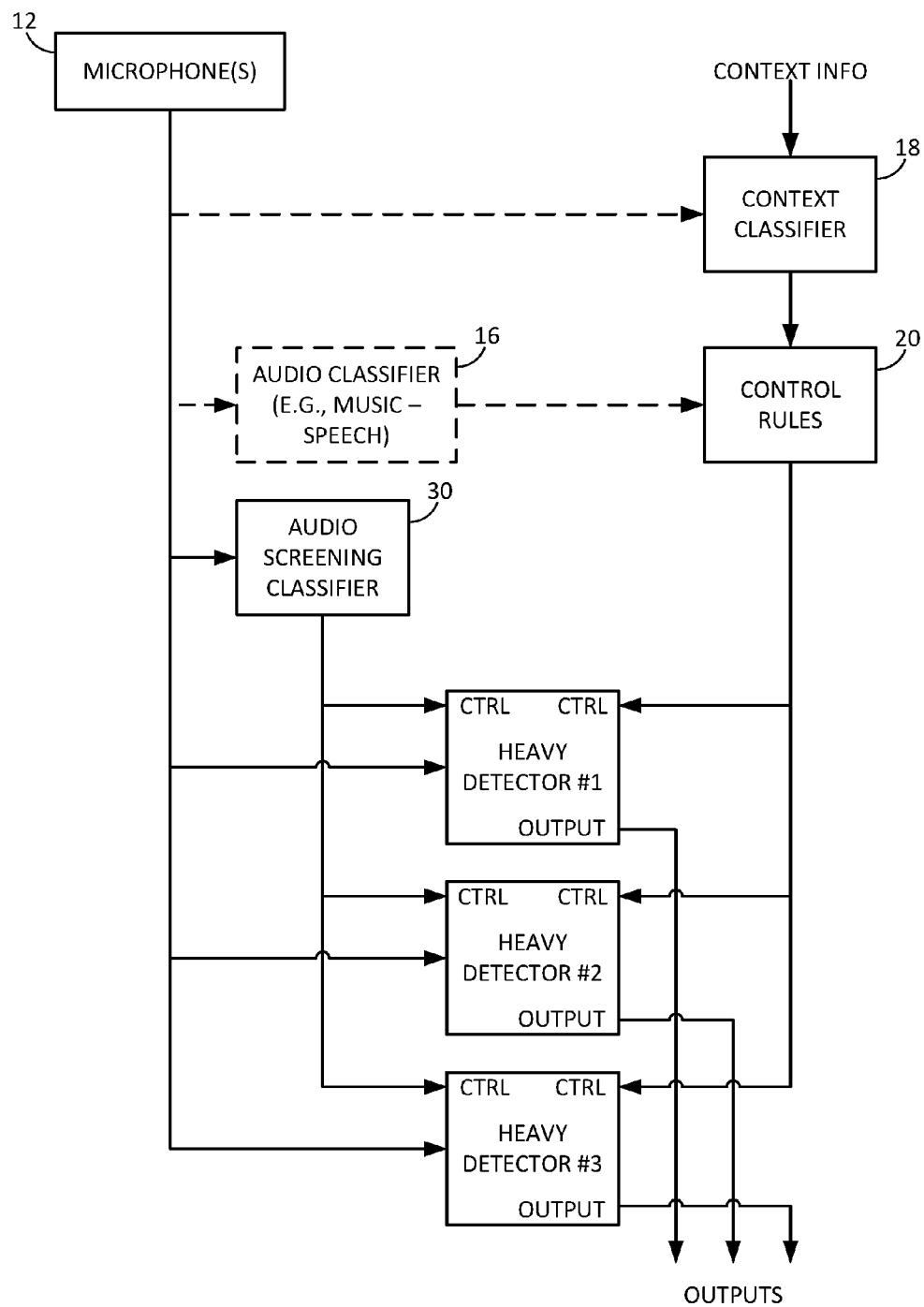
FIG. 4 is a block diagram of an apparatus employing aspects of the present technology.

Such an arrangement is shown in FIG. 4. One or more microphones provides a sensed audio signal to an audio screening classifier 30 (i.e., the "additional" classifier of the foregoing discussion). The microphone audio is optionally provided to a speech/music audio classifier 16 (as in FIG. 1) and to several heavy audio detector modules (e.g., watermark detector, speech recognition, etc.). The output of the audio screening classifier provides enable/disable control signals to the different heavy detectors. (For simplicity of illustration, the audio screening classifier 30 provides the same control signal to all the heavy detectors, but in practical implementation, different controls signals may be generated for different detectors.) The control signals from the audio screening classifier serve to disable the heavy detector(s), based on the audio sensed by the microphone.

Also shown in FIG. 4 is a context classifier 18, which operates like the second classifier module of FIG. 1. It outputs signals indicating different context scenarios. These output data are provided to a control rules module 20, which controls the mode of operation of the different heavy detector based on the identified scenario.

(While the FIG. 4 arrangements shows control of heavy detector modules, heavy classifier modules can be controlled by the same type of arrangement.)

The above-discussed principles are likewise applicable to sensing visual information. Visual image classifiers (e.g., facial recognition systems) generally work on imagery having significant spatial variation in luminance (contrast/intensity) and/or hue (color/chrominance). If frames of imagery appear that are lacking in such variations, any heavy image processing module that would otherwise be operating should suspend its operation.

Accordingly, a classifier can look for a series of image frames characterized by luminance or hue variation below a threshold, and interrupt heavy visual processing when such scene is detected. Thus, for example, heavy visual processes are suspended when the user points a camera to a blank wall, or to the floor. (Such action may also be taken based on smartphone orientation, e.g., with facial recognition only operative when the smartphone is oriented with its camera axis within 20 degrees of horizontal. Other threshold values can, of course, be used.)

Similarly, facial recognition analysis is likely wasted effort if the frame is out of focus. Accordingly, a simple classifier can examine frame focus (e.g., by known metrics, such as high frequency content and contrast measures, or by a camera shake metric—provided by the phone's motion sensors), and disable facial recognition if the frame is likely blurred.

Facial recognition can also be disabled if the subject is too distant to likely allow a correct identification. Thus, for example, if the phone's autofocus system indicates a focal distance of ten meters or more, facial recognition needn't be engaged.

While Bluetooth is one way to sense other individuals nearby, there are others.

One technique relies on the smartphone's calendar app. When the user's calendar, and phone clock, indicate the user is at a meeting, other participants in the user's proximity can be identified from the meeting participant data in the calendar app.

Another approach relies on location data, which is short range-broadcast from the phone (or published from the phone to a common site), and used to indicate co-location with other phones. The location data can be derived from known techniques, including GPS, WiFi node identification, etc.

A related approach relies on acoustic emitters that introduce subtle or inaudible background audio signals into an environment, which can be indicative of location. Software in a microphone-equipped device (e.g., a smartphone app) can listen for such signal (e.g., above or below a range of human hearing, such as above 15-20 KHz), and broadcast or publish—to a public site—information about the sensed signal. The published information can include information conveyed by the sensed signal, e.g., identifying the emitting device or its owner, the device location and/or other context, etc.). The published information can also include information associated with the receiving device (e.g., identifying the device or its owner, the device location and/or other context, etc.). This allows a group of phones near each emitter to be identified. (Related technology is employed by the Shopkick service, and is detailed in patent publication US20110029370.)

Bluetooth is presently preferred because—in addition to identifying nearby people, it also provides a communication channel with nearby phones. This enables the phones to collaborate in various tasks, including speech recognition, music fingerprinting, facial recognition, etc. For example, plural phones can exchange information about their respective battery states and/or other on-going processing tasks. An algorithm is then employed to select one phone to perform a particular task (e.g., the one with the most battery life remaining is selected to perform watermark decoding or facial recognition). This phone then transmits the results of its task—or related information based thereon—to the other phones (by Bluetooth or otherwise).

Another form of collaboration is 3D image modeling, based on camera data from two or more different phones, each with a different view of a subject. A particular application is facial recognition, where two or more different views of a person allow a 3D facial model to be generated. Facial recognition can then be based on the 3D model information—yielding a more certain identification than 2D facial recognition affords.

Yet another form of collaboration is for multiple smartphones to undertake the same task, and then share results. Different phone processes may yield results with different confidence measures, in which case the result with the highest confidence measure can be used by all phones. (Such processing can be done by processes in the cloud, instead of using the phones' own processors.)

In some applications, a phone processes ambient audio/visual stimulus in connection with phone-specific information, allowing different phones to provide different results. For example, the face of an unknown person may be identified in a Facebook account accessible to one phone, but not to others. Thus, one phone may be able to complete a task that others cannot. (Other phone-specific information includes history, contacts, computing context, user context, physical context, etc. See, e.g., published application 20110161076 and copending application Ser. No. 13/174,258, filed Jun. 30, 2011 (now U.S. Pat. No. 8,831,279). For image processing, different phones may have better or worse views of the subject.)

Relatedly, collaborating phones can send the audio/imagery they captured to one or more other phones for processing. For example, a phone having Facebook access to useful facial recognition data may not be the phone with the best view of a person to be identified. If plural phones each captures data, and shares such data (or information based thereon, e.g., eigenface data) to the other phones, results may be achieved that are better than any phone—by itself—could manage.

Of course, devices may communicate other than by Bluetooth. NFC and WiFi are two such alternatives.

Bluetooth was also noted as a technique for determining that a user is in a vehicle. Again, other arrangements can be employed.

One is GPS. Even a sporadically-executing GPS module (e.g., once every minute) can collect enough trajectory information to determine whether a user is moving in a manner consistent with vehicular travel. For example, GPS can establish that the user is following established roads, and is moving at speeds above that associated with walking or biking. (When disambiguating biking from motorized vehicle travel, terrain elevation can be considered. If the terrain is generally flat, or if the traveler is going uphill, a sustained speed of more than 20 mph may distinguish motorized transport from bicycling. However, if the user is following a road down a steep downhill incline, then a sustained speed of more than 35 mph may be used to establish motorized travel with certainty.)

If two or more phones report, e.g., by a shared short-range context broadcast, that they are each following the same geo-location-track, at the same speed, then the users of the two phones can conclude that they are traveling on the same conveyance—whether car, bus, bike, etc.

Such conclusion can similarly be made without GPS, e.g., if two or more phones report similar data from their 3D accelerometers, gyroscopes, and/or magnetometers Still further, co-conveyance of multiple users can likewise be established if two or more phones capture the same audio (e.g., as indicated by a correlation metric exceeding a threshold value, e.g., 0.9), and share this information with other nearby devices.

Again, the cloud can serve as a recipient for such information reported by the smartphones, can make determinations, e.g., about correlation between devices.

Reference was made to a short-range context broadcast. This can be effected by phones broadcasting their sensed context information (which may include captured audio) by Bluetooth to nearby devices. The information shared may be of such a character (e.g., acceleration, captured audio) that privacy concerns do not arise—given the short range of transmission involved.

While this specification focuses on audio applications, and also considers facial recognition, there are unlimited classes that might be recognized and acted-on. A few other visual classes include optical character recognition (OCR) and barcode decoding.

The presence of multiple cameras on a smartphone enables other arrangements. For example, as noted in application Ser. No. 13/212,119, filed Aug. 17, 2011 (now U.S. Pat. No. 8,564,684), a user-facing camera can be used to assess emotions of a user (or user response to information presented on the smartphone screen), and tailor operation of the phone—including use of the other camera—accordingly.

A user-facing camera can also detect the user's eye position. Operation of the phone can thereby be controlled. For example, instead of switching between "portrait" and "landscape" display modes based on the phone's position sensors, this screen display mode can be controlled based on the orientation of the user's eyes. Thus, if the user is lying in bed on her side (i.e., with a line between the pupils extending vertically), and the phone is spatially oriented in a landscape direction (with its long axis extending horizontally, parallel to the axis of the user's body), the phone can operate its display in the "portrait" mode. If the user turns the phone ninety degrees (i.e., so that its long axis is parallel to the axis between the users' eyes), the phone switches its display mode to "landscape."

Similarly, if the user is lying on her back, and holding the phone overhead, the screen mode switches to follow the relative orientation of the axis between the user's eyes, relative to the screen axis. (That is, if the long axis of the phone is parallel with the axis between the user's eyes, landscape mode is used; and vice versa.)

If the phone is equipped with stereo cameras (i.e., two cameras with fields of view that overlap), the two views can be used for distance determination to any point in the frame (i.e., range finding). For certain visual detection tasks (e.g., watermark and barcode decoding), the distance information can be used by the phone processor to guide the user to move the phone closer to, or further from, the intended subject in order to achieve best results.

A phone may seek to identify an audio scene by reference to sensed audio. For example, a meeting room scene may be acoustically characterized by a quiet background, with distinguishable human speech, and with occasional sound source transition (different people speaking alternatively). A home scene with the user and her husband may be acoustically characterized by a mid-level background audio (perhaps music or television), and by two different voices speaking alternately. A crowded convention center may be characterized by a high-level background sound, with many indistinguishable human voices, and occasionally the user's voice or another.

Once an audio scene has been identified, two or more smartphones can act and cooperate in different ways. For example, if the scene has been identified as a meeting, the user's phone can automatically check-in for the room, indicating that the meeting room is occupied. (Calendar programs are often used for this, but impromptu meetings may occupy rooms without advance scheduling. The smartphone can enter the meeting on the calendar—booking the room against competing reservations—after the meeting has started.)

The phone may communicate with a laptop or other device controlling a Powerpoint slide presentation, to learn the number of slides in the deck being reviewed, and the slide currently being displayed. The laptop or the phone can compute how quickly the slides are being advanced, and extrapolate when the meeting will conclude. (E.g., if a deck has 30 slides, and it has taken 20 minutes to get through 15 slides, a processor can figure it will take a further 20 minutes to get through the final 15 slides. Adding 10 minutes at the end for a wrap-up discussion, it can figure that the meeting will conclude in 30 minutes.) This information can be shared with participants, or posted to the calendar app to indicate when the room might become available.

If the auditory scene indicates a home setting in the presence of a spouse, the two phones can exchange domestic information (e.g., shopping list information, social calendar data, bills to be paid soon, etc.).

In a crowded convention center scene, a phone can initiate automatic electronic business card exchange (e.g., v-card), if it senses the user having a chat with another person, and the phone does not already have contact information for the other person (e.g., as identified by Bluetooth-indicated cell phone number, or otherwise).

In the convention scene, the user's phone might also check the public calendars of people with whom the user talks, to identify those with similar transportation requirements (e.g., a person whose flight departs from the same airport as the user's departing flight, with a flight time within 30 minutes of the user's flight). Such information can then be brought to the attention of the user, e.g., with an audible or tactile alert.

Reference was made to performing certain operations in the cloud. Tasks can be referred to the cloud based on various factors. An example is use cloud processing for "easy to transmit" data (i.e., small size) and "hard to calculate" tasks (i.e., computationally complex). Cloud processing is often best suited for tasks that don't require extensive local knowledge (e.g., device history and other information stored on the device).

Consider a traveler flying to San Francisco for a conference, who needs to commute to a conference center hotel downtown. On landing at the airport, the user's phone sends the address of the downtown hotel/conference center to a cloud server. The cloud server has knowledge of real-time traffic information, construction delays, etc. The server calculates the optimal route under various constraints, e.g., shortest-time route, shortest-distance route, most cost-effective route, etc. If the user arrives at the airport only 20 minutes before the conference begins, the phone suggests taking a taxi (perhaps suggesting sharing a taxi with others that it senses have the same destination—perhaps others who also have a third-party trustworthiness score exceeding "good"). In contrast, if the user arrives a day ahead of the conference, the phone suggests taking BART—provided the user traveled with one piece of checked baggage or less (determined by reference to airline check-in data stored on the smartphone). Such route selection task is an example of "little data, big computation."

In addition to audio and imagery from its own sensors, the smartphone can rely on audio and imagery collected by public sensors, such as surveillance cameras in a parking garage, mall, convention center, or a home security system. This information can be part of the "big computation" provided by cloud processing. Or the data can be processed exclusively by the smartphone, such as helping the user find where she parked her yellow Nissan Leaf automobile in a crowded parking lot.

While the specification has focused on analysis of audio and image data, the same principles can be applied to other data types. One is haptic data. Another is gas and chemical analysis. Related is olfactory information. (Smell sensors can be used by smartphones as a diagnostic aid in medicine, e.g., detecting biomarkers that correlate to lung cancer in a user's breath.)

Naturally, information from the user's social networking accounts (Facebook, Twitter, Foursquare, Shopkick, LinkedIn, etc.) can be used as input to the arrangements detailed herein (e.g., as context information). Likewise with public information from the accounts of people that the user encounters, e.g., at work, home, conferences, etc. Moreover, information output from the detailed arrangements can be posted automatically to the user's social networking account(s).

It will be recognized that facial recognition has a number of uses. One, noted above, is as a memory aid—prompting the user with a name of an acquaintance. Another is for user identification and/or authorization. For example, the user's smartphone may broadcast certain private information only if it recognizes a nearby person as a friend (e.g., by reference to the user's list of Friends on Facebook). Facial recognition can also be used to tag images of a person with the person's name and other information.

In some embodiments a user's smartphone broadcasts one or more high quality facial portraits of the user, or associated eigenface data. Another smartphone user can snap a poor picture of the user. That smartphone compares the snapped image with high quality image data (or eigenface data) received over Bluetooth from the user, and can confirm that the poor picture and the received image data correspond to the same individual. The other smartphone then uses the received image data in lieu of the poor picture, e.g., for facial recognition, or to illustrate a Contacts list, or for any other purpose where the user's photo might be employed.

Figures 5, 6:
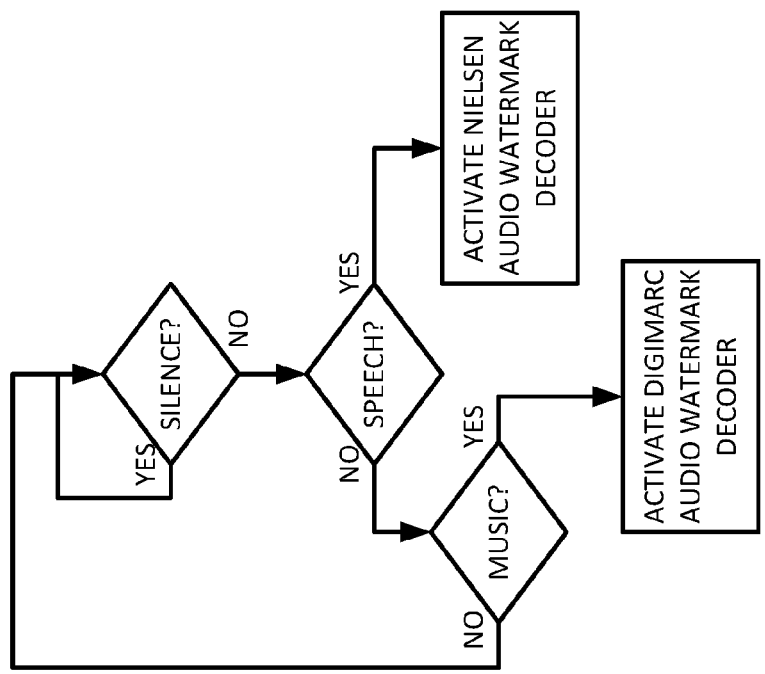
FIG. 5 is an event controller table illustrating, for one embodiment, how different audio recognition agents are activated based on audio classification data.
FIG. 6 is a flow chart illustrating, for one embodiment, how different audio recognition agents are activated based on audio classification data.

FIG. 5 shows an event controller table for another audio embodiment, indicating how two digital watermark decoders (one tailored for watermarks commonly found in music, another tailored for watermarks commonly found in broadcast speech) are controlled, based on classifier data categorizing input audio as likely silence, speech, and/or music. FIG. 6 shows a corresponding flow chart.

FIG. 7 shows an event controller table for another embodiment—this one involving imagery. This arrangement shows how different recognition modules (1D barcode, 2D barcode, image watermark, image fingerprint, and OCR) are controlled in accordance with different sensor information. (Sensors can encompass logical sensors, such as classifiers.) In the illustrated arrangements, the system includes a light sensor, and a motion sensor. Additionally, one or more image classifiers outputs information identifying the imagery as likely depicting text, a 1D barcode, or a 2D barcode.

Note that that there is no classifier output for "image." Everything is a candidate. Thus, the image watermark decoding module, and the image fingerprint module, are activated based on certain combinations of outputs from the classifier(s) (e.g., when none or all of the three types of classified images is identified).

Note, too, how no image recognition processing is undertaken when the system detects a dark scene, or the system detects that the imagery was captured under conditions of motion ("jerk") that make image quality dubious.

Figure 8:
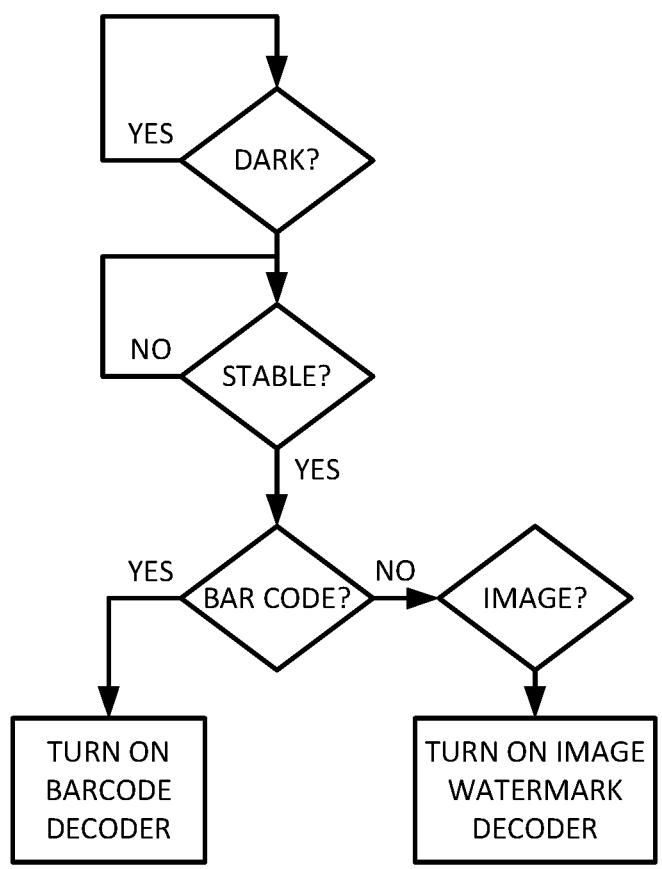
FIG. 8 is a flow chart illustrating, for one embodiment, how different image recognition agents are activated based on outputs from light and motion sensors, and image classification data.

FIG. 8 shows a corresponding flow chart.

Published application 20120208592 further details technology useful with the arrangements of FIGS. 5-8.

More on Audio Classification

Audio classification problem is often termed as content-based classification/retrieval, or audio segmentation. There are two basic issues in this work: feature selection and classifier selection.

One of the early works in this field was published in 1996 by Wold et al. [5]. He used various perceptual features (loudness, pitch, brightness, bandwidth and harmonicity) and the nearest neighbor classifier. In [6], Foote used the 13 Mel-Frequency Cepstral Coefficients (MFCCs) as audio features, and a vector quantization method for classification. In [7], Zhang and Kuo used hidden Markov models to characterize audio segments, and a hierarchical classifier is used for two-step classification. Scheirer, in [12], evaluated the properties of 13 features for classify speech and music, achieving very high accuracy (around 95% accuracy, but only for music/speech classification), especially integrating long segments of sound (2.4 seconds). Liu et al. [8] argued that "audio understanding can be based on features in three layers: low-level acoustic characteristics, intermediate-level audio signatures associated with different sounding objects, and high level semantic models of audio in different scene classes"; and "classification based on these low-level features alone may not be accurate, but the error can be addressed in a higher layer by examining the structure underlying a sequence of continuous audio clips."

Meanwhile, in terms of calculating low-level features, [6,8] mentioned explicitly to firstly divide the audio samples into 1-second long clips and then further divide each clip into 40 non-overlapping 25-milisecond long sub-clips. The low-level features are calculated on each 25-millisecond long sub-clip and then merged through the 40 sub-clips to represent the 1-second long clip. The classification is based on the 1-second long clips. (In a 25-milisecond period, the sound signal shows a stationary property, whereas in a 1-second period, the sound signal exhibits characteristics corresponding to the categories that we want to distinguish. In these early references, and also in later years, these categories include silence, music, speech, environment sound, speech with environment sound, etc.

In the 2000s, Microsoft Research Asia worked actively on audio classification, as shown in [9,10]. Lu in [9] used low-level audio features, including 8 order MFCCs and several other perceptual features, as well as kernel SVM (support vector machine) as the classifier in a cascaded scheme. The work in [10] also included perceptual features and used different classifiers in a cascaded classification scheme, including k-NN, LSP VQ and rule based methods (for smoothing). In this paper they used dynamic feature sets (use different features) for classifying different classes.

More recently, work on audio classification has increased. Some people work on exploiting new audio features, like [2,3,4,17], or new classifiers [13]. Others work on high level classification framework beyond the low level features, like [1,18]. Still others work on the applications based on audio classification, for example, determination of emotional content of video clips [16].

Other researchers are comparing existing feature extraction methods, classifier, and parameter selection schemes, making audio classification implementation practical, and even have prototype implemented on a Nokia cellphone [14,15].

Arrangements particularly focused on speech/music discrimination include [19] and [20].

REFERENCES

1. Rui Cai, Lie Lu, Alan Hanjalic, Hong-Jiang Zhang, and Lian-Hong Cai, "A flexible framework for key audio effects detection and auditory context inference," IEEE Transactions on audio, speech, and language processing, vol. 14, no. 13, May 2006. (MSRA group)

2. Jalil Shirazi, and Shahrokh Ghaemmaghami, "Improvement to speech-music discrimination using sinusoidal model based features," Multimed Tools Appl, vol. 50, pp. 415-435, 2010. (Islamic Azad University, Iran; and Sharif University of Technology, Iran)

3. Zhong-Hua Fu, Jhing-Fa Wang and Lei Xie, "Noise robust features for speech-music discrimination in real-time telecommunication," Multimedia and Expo, 2009 IEEE International Conference on (ICME 2009), pp. 574-577, 2009. (Northwestern Polytech Univ., China; and National Cheng Kung University, Taiwan)

4. Ebru Dogan, et al., "Content-based classification and segmentation of mixed-type audio by using MPEG-7 features," 2009 First International Conference on Advances in Multimedia, 2009. (ASELSAN Electronics Industries Inc.; and Baskent Univ.; and Middle East Technical Univ., Turkey)

5. Erling Wold, Thom Blum, Douglas Keislar, and James Wheaton, "Content-based classification, search and retrieval of audio," IEEE Multimedia Magazine, vol. 3, no. 3, pp. 27-36, 1996. (Muscle Fish)

6. Jonathan Foote, "Content-based retrieval of music and audio," Multimedia storage and archiving systems II, Proc. Of SPIE, vol. 3229, pp. 138-147, 1997. (National University of Singapore)

7. Tong Zhang and C.-C. J. Kuo, "Audio-guided audio-visual data segmentation, indexing, and retrieval," In Proc. Of SPIE storage and retrieval for Image and Video Databases VII, 1999. (Integrated Media System Center, USC)

8. Zhu Liu, Yao Wang and Tsuhan Chen, "Audio feature extraction and analysis for scene segmentation and classification," Journal of VLSI Signal Processing Systems, pp. 61-79, 1998. (Polytechnic University)

9. Lie Lu, Stan Z. Li and Hong-Jiang Zhang, "Content-based audio segmentation using support vector machines," ICME 2001. (MSRA)

10. Lie Lu, Hao Jiang and Hongjiang Zhang, "A robust audio classification and segmentation method," ACM Multimedia, 2001. (MSRA)

11. Lie Lu and Alan Hanjalic, "Text-like segmentation of general audio for content-based retrieval," IEEE Transactions on Multimedia, vol. 11, no. 4, June 2009.

12. Eric Scheirer and Malcolm Slaney, "Construction and evaluation of a robust multifeature speech/music discriminator," ICASSP 1997. (MIT Media Lab)

13. Dong-Chul Park, "Classification of audio signals using Fuzzy c-means with divergence-based kernel," Pattern Recognition Letters, vol. 30, issue 9, 2009. (Myong Ji University, Republic of Korea)

14. Mikko Perttunen, Max Van Kleek, Ora Lassila, and Jukka Riekki, "Auditory context recognition using SVMs," The second International Conference on Mobile Ubiquitous Computing, Systems, Services and Technologies (Ubicomm 2008), 2008. (University of Oulu, Finland; CSAIL, MIT; Nokia Research Center Cambridge, Mass.)

15. Mikko Perttunen, Max Van Kleek, Ora Lassila, and Jukka Riekki, "An implementation of auditory context recognition for mobile devices," Tenth International Conference on Mobile Data Management: Systems, Services and Middleware, 2009. (University of Oulu, Finland; CSAIL, MIT; Nokia Research Center Cambridge, Mass.)

16. Rene Teixeira, Toshihiko Yamasaki, and Kiyoharu Aizawa, "Determination of emotional content of video clips by low-level audiovisual features," Multimedia Tools and Applications, pp. 1-29, January 201. (University of Tokyo)

17. Lei Xie, Zhong-Hua Fu, Wei Feng, and Yong Luo, "Pitch-density-based features and an SVM binary tree approach for multi-class audio classification in broadcast news," Multimedia Systems, vol. 17, pp. 101-112, 2011. (Northwestern Polytechnic University, China)

18. Lie Lu, and Alan Hanjalic, "Text-like segmentation of general audio for content-based retrieval," IEEE Transactions on Multimedia, vol. 11, no. 4, pp. 658-699, 2009. (MSRA; Delft University of Technology, Netherlands)

19. Chen et al, Mixed Type Audio Classification with Support Vector Machine, 2006 IEEE Int'l Conf on Multimedia and Expo, pp. 781-784.

20. Harb et al, Robust Speech Music Discrimination Using Spectrum's First Order Statistics and Neural Networks, $7^{th}$ Int'l Symp. on Signal Proc. and its Applications, 2003.

Exemplary classifiers also include those detailed in patent publications 20020080286 (British Telecomm), 20020080286 (NEC), 20020080286 (Philips), 20030009325 (Deutsche Telekom), 20040210436 (Microsoft), 20100257129 and 20120109643 (Google), and U.S. Pat. No. 5,712,953 (Hewlett-Packard).

Other Remarks

Having described and illustrated the principles of our inventive work with reference to illustrative examples, it will be recognized that the technology is not so limited.

For example, while reference has been made to smartphones, it will be recognized that this technology finds utility with all manner of devices—both portable and fixed. PDAs, organizers, portable music players, desktop computers, laptop computers, tablet computers, netbooks, wearable computers, servers, etc., can all make use of the principles detailed herein.

Similarly, it is expected that head-worn devices (e.g., Google Glass goggles), and other unobtrusive sensor platforms will eventually replace today's smartphones. Naturally, the present technology can be used with such other forms of devices.

The term "smartphone" should be construed to encompass all such devices, even those that are not strictly-speaking cellular, nor telephones.

(Details of the iPhone, including its touch interface, are provided in Apple's published patent application 20080174570.)

The design of smartphones and other computers used in embodiments of the present technology is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a microphone, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc.).

While this specification earlier noted its relation to the assignee's previous patent filings, it bears repeating. These disclosures should be read in concert and construed as a whole. Applicants intend that features in each be combined with features in the others. That is, it should be understood that the methods, elements and concepts disclosed in the present application be combined with the methods, elements and concepts detailed in those related applications. While some have been particularly detailed in the present specification, many have not—due to the large number of permutations and combinations is large. However, implementation of all such combinations is straightforward to the artisan from the provided teachings.

The processes and system components detailed in this specification may be implemented as instructions for computing devices, including general purpose processor instructions for a variety of programmable processors, including microprocessors, graphics processing units (GPUs, such as the nVidia Tegra APX 2600), digital signal processors (e.g., the Texas Instruments TMS320 series devices), etc. These instructions may be implemented as software, firmware, etc. These instructions can also be implemented to various forms of processor circuitry, including programmable logic devices, FPGAs (e.g., the noted Xilinx Virtex series devices), FPOAs (e.g., the noted PicoChip devices), and application specific circuits—including digital, analog and mixed analog/digital circuitry. Execution of the instructions can be distributed among processors and/or made parallel across processors within a device or across a network of devices. Transformation of content signal data may also be distributed among different processor and memory devices. References to "processors" or "modules" should be understood to refer to functionality, rather than requiring a particular form of hardware and/or software implementation.

Software instructions for implementing the detailed functionality can be readily authored by artisans, from the descriptions provided herein, e.g., written in C, C++, Visual Basic, Java, Python, Tcl, Perl, Scheme, Ruby, etc. Smartphones and other devices according to certain implementations of the present technology can include software modules for performing the different functions and acts. Known artificial intelligence systems and techniques can be employed to make the inferences, conclusions, and other determinations noted above.

Commonly, each device includes operating system software that provides interfaces to hardware resources and general purpose functions, and also includes application software which can be selectively invoked to perform particular tasks desired by a user. Known browser software, communications software, and media processing software can be adapted for many of the uses detailed herein. Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

While this disclosure has detailed particular ordering of acts and particular combinations of elements in the illustrative embodiments, it will be recognized that other contemplated methods may re-order acts (possibly omitting some and adding others), and other contemplated combinations may omit some elements, add others, and configure the elements differently, etc.

Although disclosed as a complete system, sub-combinations of the detailed arrangements are also separately contemplated.

While detailed primarily in the context of systems that perform audio capture and processing, corresponding arrangements are equally applicable to systems that capture and process visual stimulus (imagery), or that capture and process both imagery and audio.

Similarly, while certain aspects of the technology have been described by reference to illustrative methods, it will be recognized that apparatus configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The reference to Bluetooth technology to indicate proximity to, and identity of, nearby persons is illustrative only. Many alternative technologies are known to perform one or both of these functions, and can be readily substituted.

The illustrations should be understood as exemplary and not limiting.

It is impossible to expressly catalog the myriad variations and combinations of the technology described herein. Applicants recognize and intend that the concepts of this specification can be combined, substituted and interchanged—both among and between themselves, as well as with those known from the cited prior art. Moreover, it will be recognized that the detailed technology can be included with other technologies—current and upcoming—to advantageous effect.

The reader is presumed to be familiar with the documents (including patent documents) referenced herein. To provide a comprehensive disclosure without unduly lengthening this specification, applicants incorporate-by-reference these documents referenced above. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

We claim:

1. A method performed by a hardware system configured by software instructions, the method comprising the acts:

receiving first audio and/or visual information, and applying a classification procedure to the received first audio and/or visual information to identify its type from among plural possible types;

determining a first scenario type, based at least in part on one or more of time of day, day of week, location, calendar data, clock alarm status, motion sensor data, orientation sensor data, and information from a social networking service;

based on the identified type of the received first audio and/or visual information, and based on the determined first scenario type, selecting a first group of one or more recognition technologies from a set of available recognition technologies, and applying the selected first group of recognition technologies to the received first audio and/or visual information;

receiving second audio and/or visual information, and applying a classification procedure to the received second audio and/or visual information to identify its type from among plural possible types;

determining a second scenario type, based at least in part on one or more of time of day, day of week, location, calendar data, clock alarm status, motion sensor data, orientation sensor data, and information from a social networking service;

based on the identified type of the received second audio and/or visual information, and based on the determined second scenario type, selecting a second group of one or more recognition technologies from a set of available recognition technologies, and applying the selected second group of recognition technologies to the received second audio and/or visual information;

receiving third audio and/or visual information, and applying a classification procedure to the received third audio and/or visual information to identify its type from among plural possible types;

determining a third scenario type, based at least in part on one or more of time of day, day of week, location, calendar data, clock alarm status, motion sensor data, orientation sensor data, and information from a social networking service; and based on the identified type of the received third audio and/or visual information, and based on the determined third scenario type, selecting a third group of one or more recognition technologies from a set of available recognition technologies, and applying the selected third group of recognition technologies to the received third audio and/or visual information;

wherein:

the selected first, second and third groups of one or more recognition technologies are different;

at least one of the selected groups of one or more recognition technologies includes two or more recognition technologies;

the first and second information are classified as the same type, and yet said first and second selected groups of recognition technologies are different, due to differences in the determined first and second scenario types; and one of said first or second selected groups of recognition technologies includes a watermark-, fingerprint-, barcode-based, or optical character-recognition technology that is not included in the other of said first or second selected groups of recognition technologies.

2. The method of claim 1 in which the received first, second and third audio and/or visual information all comprises audio information.

3. The method of claim 1 in which the received first, second and third audio and/or visual information all comprises visual information.

4. The method of claim 1 in which at least one of the first, second and third scenario types is based on time of day.

5. The method of claim 1 in which at least one of the first, second and third scenario types is based on day of week.

6. The method of claim 1 in which at least one of the first, second and third scenario types is based on location.

7. The method of claim 1 in which at least one of the first, second and third scenario types is based on calendar data.

8. The method of claim 1 in which at least one of the first, second and third scenario types is based on clock alarm status.

9. The method of claim 1 in which at least one of the first, second and third scenario types is based on motion sensor data.

10. The method of claim 1 in which at least one of the first, second and third scenario types is based on orientation sensor data.

11. The method of claim 1 in which at least one of the first, second and third scenario types is based on information from a social networking service.

12. The method of claim 1 in which one of the first, second and third groups of one or more recognition technologies includes watermark decoding technology, and another of said first, second and third groups of one or more recognition technologies does not include watermark decoding technology.

13. The method of claim 1 in which one of said first, second and third groups of one or more recognition technologies includes fingerprinting technology, and another of said first, second and third groups of recognition technologies does not include fingerprinting technology.

14. The method of claim 1 in which one of said first, second and third groups of one or more recognition technologies includes barcode decoding technology, and another of said first, second and third groups of one or more recognition technologies does not include barcode decoding technology.

15. The method of claim 1 in which one of said first, second and third groups of one or more recognition technologies includes optical character recognition technology, and another of said first, second and third groups of one or more recognition technologies does not include optical character recognition technology.

16. The method of claim 1 that further includes:

receiving fourth audio and/or visual information, and applying a classification procedure to the received fourth audio and/or visual information to identify its type; determining a fourth scenario type, based at least in part on one or more of time of day, day of week, location, calendar data, clock alarm status, motion sensor data, orientation sensor data, and information from a social networking service; and based on the identified type of the received fourth audio and/or visual information, and based on the determined fourth scenario type, selecting a fourth group of one or more recognition technologies, and applying the selected fourth group of recognition technologies to the received fourth audio and/or visual information;

wherein the selected first, second, third and fourth groups of one or more recognition technologies are different;

two of the received first, second, third or fourth audio and/or visual information comprise audio information; and two of the received first, second, third or fourth audio and/or visual information comprise visual information.

* * * * *